United States Patent [19]

Martinelli

[11] Patent Number: 4,674,019
[45] Date of Patent: Jun. 16, 1987

[54] TRANSFORMER-COUPLED TWO-INDUCTOR BUCK CONVERTER

[75] Inventor: Robert M. Martinelli, Torrance, Calif.

[73] Assignee: Keller-Mullett Technology, Los Angeles, Calif.

[21] Appl. No.: 852,566

[22] Filed: Apr. 16, 1986

[51] Int. Cl.$^4$ .............................................. H02M 3/335
[52] U.S. Cl. ........................................ 363/20; 363/24; 363/39
[58] Field of Search ................... 363/18, 19, 20, 21, 363/22, 23, 24, 25, 39, 45

[56] References Cited

U.S. PATENT DOCUMENTS

| | | | |
|---|---|---|---|
| 4,184,197 | 1/1980 | Cuk et al. | 363/16 |
| 4,186,437 | 1/1980 | Cuk | 363/16 |
| 4,257,087 | 3/1981 | Cuk | 363/16 |
| 4,274,133 | 6/1981 | Cuk et al. | 363/39 |

OTHER PUBLICATIONS

Landsman; "A Unifying Derivation of Switching DC/DC Converter Topologies"; 1979 IEEE.

Primary Examiner—Patrick R. Salce
Assistant Examiner—Sterrett
Attorney, Agent, or Firm—John T. Matlago

[57] ABSTRACT

A transformer-coupled two-inductor buck converter is provided which comprises a series input circuit including an input inductor, a capacitor and a grounded inductor. The input and grounded inductors are wound so that a source of d.c. input voltage can be connected across positive polarity outer ends thereof. A transformer is provided for coupled the input and output circuits of the converter. When a switching transistor in the input circuit turns on, input current conducting through the input inductor joins with current being dragged out of the grounded inductor and through the capacitor to conduct through the primary winding of the transformer and couple to the secondary winding for delivery as output current to the load. An output winding coupled to the grounded inductor is connected by a switching diode to the load. When the switching transistor turns off, stored current energy in the input inductor conducts through the capacitor into the grounded inductor and joins with stored current energy in the grounded inductor in commutating to the output winding and conducting through the switching diode for delivery as output current to the load. The input and output currents are continuous with a ripple. The ripple on the input current can be reduced to zero by coupling the input inductor and the grounded inductor together on a common core along with the output winding.

16 Claims, 9 Drawing Figures

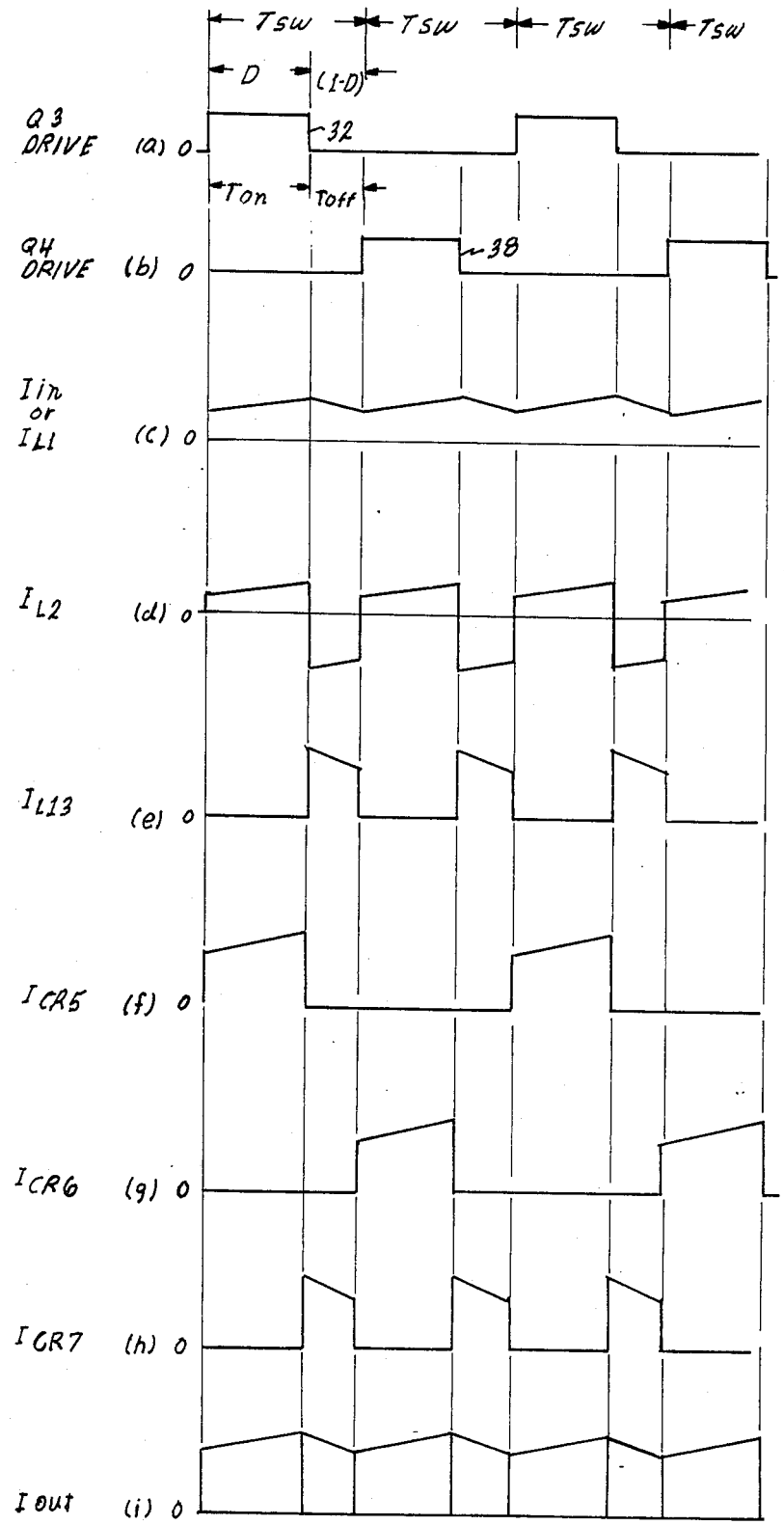

TRANSFORMER-COUPLED TWO-INDUCTOR BUCK CONVERTER

BACKGROUND OF THE INVENTION

This invention relates to d.c. to d.c. converters and more particularly to a transformer-coupled two-inductor buck converter.

It is highly desirable to provide a d.c. to d.c. buck converter, i.e., a converter capable of simply transforming a d.c. input voltage to a selected lower level d.c. output voltage. Such a converter is important since the input voltage provided by a d.c. source is seldom the correct d.c. voltage level needed to operate a given piece of equipment.

When providing such a buck converter it is desirable to use a topology which inherently provides for both the input and output currents to be continuous. By continuous is meant that the input and output currents have no abrupt changes in level and are never zero in value. Moreover, in many applications, it is desirable to provide such a buck converter which inherently enables even a ripple on the input current to be minimized or even reduced to zero thereby providing a steady d.c. input current. This reducing of abrupt changes and ripple on the input current of a buck converter is especially important because of the need for preventing electromagnetic interference (EMI) effects from being present on other equipment that may be tied into the same supply line from a source of d.c. input voltage.

It is further desirable to provide a buck converter which inherently provides continuous input and output currents wherein the input and output circuits of the buck converter are transformer-coupled so as to isolate the ground return of the source and load since most applications of a buck converter require such isolation.

SUMMARY AND OBJECTS OF THE INVENTION

A first embodiment of the transformer-coupled two-inductor buck converter in accordance with the present invention is a forward type converter which comprises a series input circuit including an input inductor, a capacitor and a grounded inductor. The input and grounded inductors of the series circuit are wound so that a d.c. input voltage source can be connected across the same polarity outer ends of these inductors. A transformer for coupling the input and output circuits of the buck converter has one end of its primary winding connected to the junction between the input inductor and the capacitor and has its opposite end connected by way of a switching transistor to a reflected output ground return for the input circuit. The secondary winding of the transformer has one end connected to a first rectifying diode oriented to conduct positive current to the output and the other end connected to a ground return for the output circuit. A reset voltage winding coupled to the transformer has one end connected to the reflected output ground return for the input circuit and the opposite end connected to a rectifying diode oriented to conduct positive current to the junction between the capacitor and the grounded inductor. In addition, an output winding is coupled to the grounded inductor to form a magnetic component. The output winding has one end connected to the ground return for the output circuit and the opposite end connected to a second rectifying diode oriented to pass positive current to the output. The input inductor and the grounded inductor may be coupled along with the output winding to form a single magnetic component when it is advantageous in a particular application of the buck converter to reduce ripple on the input current to zero.

A second embodiment of a transformer-coupled two-inductor buck converter in accordance with the present invention is a push-pull type converter which, similarly to the first embodiment, comprises a series input circuit including an input inductor, a capacitor and a grounded inductor. The input and grounded inductors are here also wound so that a d.c. input voltage source can be connected across the same polarity outer ends of these inductors. A transformer for coupling the input and output circuits of the buck converter has the midpoint of its primary winding connected to the junction between the input inductor and the capacitor and has its opposite ends respectively connected by first and second switching transistors to the reflected output ground return for the input circuit. The secondary winding of the transformer has its midpoint connected to the ground return for the output circuit and its opposite ends respectively connected through first and second rectifying diodes oriented to conduct positive current to the output. In addition, an output winding which is coupled to the grounded inductor to form a magnetic component has one end connected to the ground return for the output circuit and the opposite end connected to a third rectifying diode oriented to pass positive current to the output. The input inductor and the grounded inductor may be coupled on a common core along with the output winding to form a single magnetic component when it is advantageous in a particular application of the buck converter to reduce ripple on the input current to zero.

Accordingly, one of the objects of the present invention is to provide a two-inductor buck converter with a transformer for coupling the input and output circuits thereof.

Another object of the present invention is to provide a low-cost, highly reliable, transformer-coupled two-inductor buck converter.

Another object is to provide a transformer-coupled two-inductor buck converter which inherently provides continuous currents on the input and output thereof.

Still another object of the present invention is to provide a transformer-coupled two-inductor buck converter wherein the inductors may be coupled to provide zero ripple on the input current.

Yet another object of the present invention is to provide a transformer-coupled two-inductor buck converter which inherently provides continuous input and output currents and also inherently provides for reducing ripple on the input current more simply and with less components than required by the use of conventional input filters.

These and other objects and features of the present invention will be apparent from a consideration of the following description when viewed in the light of the accompanying drawings which illustrate the preferred embodiments of the invention.

BRIEF DESCRIPTION OF THE DRAWINGS

FIG. 8 shows waveforms for explaining the operation of the transformer-coupled two-inductor push-pull buck converter in FIG. 7.

DESCRIPTION OF THE PRIOR ART

Figure 1:
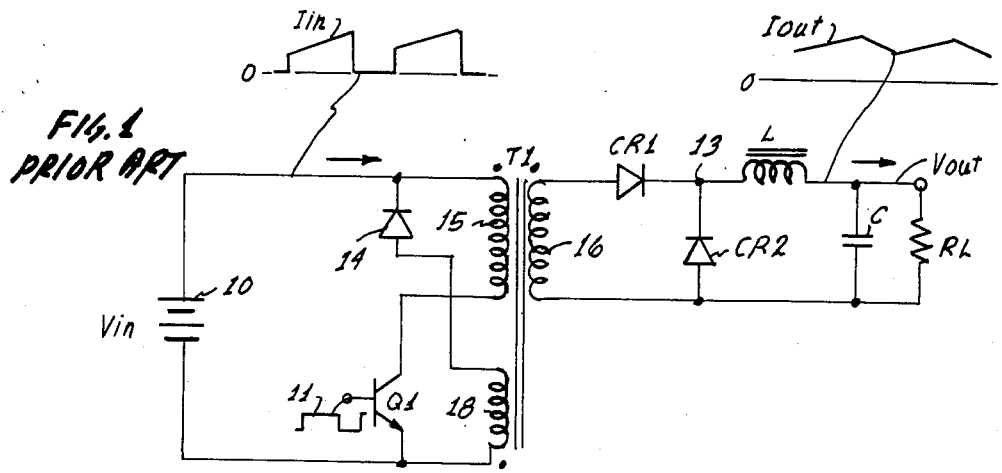
FIG. 1 is a circuit diagram of a conventional transformer-coupled buck converter.

FIG. 1 shows a conventional transformer-coupled forward buck converter which includes a transformer T1 having a primary winding 15 and a secondary winding 16. As noted, the dot ends of primary winding 15 and secondary winding 16, indicating the same polarity, are adjacent to each other. A d.c. input voltage source 10 is connected to the dot end of the primary winding 15 whose non-dot end is connected to the collector of a switching npn transistor Q1 having its emitter connected to ground. The dot end of secondary winding 16 is connected by a rectifying diode CR1 to an inductor L connected to the output load $R_L$. The diode CR1 is oriented to be forward biased when the dot end of secondary winding 16 is positive in polarity. A capacitor C is connected across the load $R_L$ to help average the output current Iout. A second rectifying diode CR2 connected between the junction 13 of diode CR1 and the inductor L and the ground return for the load is oriented to conduct when the transistor Q1 is turned off.

Figure 2:
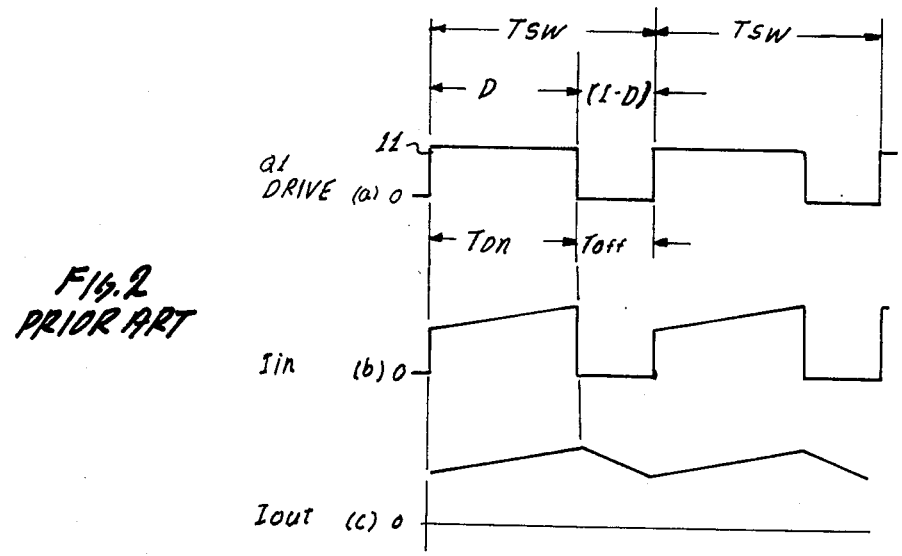
FIG. 2 shows waveforms for explaining the operation of the conventional transformer-coupled buck converter shown in FIG. 1.

Referring to FIG. 2, the switching transistor Q1 is provided with a square wave driving voltage 11 during each switching period Tsw having a frequency of 1/Tsw. Thus, as shown in FIG. 2a, when the square wave driving voltage 11 is present the switching transistor Q1 is turned on for the first portion of a Tsw switching period referred to as Ton time and when the square wave driving voltage is absent the switching transistor Q1 is turned off for the remaining portion of the switching period Tsw referred to as Toff time.

During the Ton time operation of the converter shown in FIG. 1, a pulse of the input current Iin (FIG. 2b) is passed through transistor Q1 and during the Toff time operation the input current Iin is zero. Thus, during Ton time the pulse of input current Iin conducts through the primary winding 15 of transformer T1 and transfers current energy to the secondary winding 16 which conducts through diode CR1, and upon conducting through inductor L to the load $R_L$, stores energy in inductor L. During Toff time, the stored energy in inductor L continues to conduct to the load through diode CR2. The capacitor C helps to average out the current to thereby provide a d.c. output current Iout (FIG. 2c) with a ripple.

It should now be noted that in the conventional transformer-coupled forward buck converter shown in FIG. 1, the output current Iout is continuous with a ripple but the input current Iin is discontinuous, i.e., pulsating. Such pulsating of the input current Iin causes electromagnetic interference (EMI) problems on the input of the converter which must be removed by generally providing as many as two stages of input filtering, each stage comprising an inductor and a capacitor.

It should be further noted that the conventional transformer-coupled forward buck converter shown in FIG. 1 operates by controlling the duty cycle D of the switching transistor Q1, where D=Ton/Tsw, by controlling the duration of the square wave driving voltage 11 used to drive the switching transistor Q1. The duty cycle D is controlled because the desired output voltage Vout is a fraction of the input voltage Vin which fraction is exactly equal to the duty cycle D. Accordingly, as well known, the voltage and current transfer functions for a conventional buck converter can be expressed as Vout=DVin and Iin=DIout.

DETAILED DESCRIPTION OF THE PREFERRED EMBODIMENTS

Figure 3:
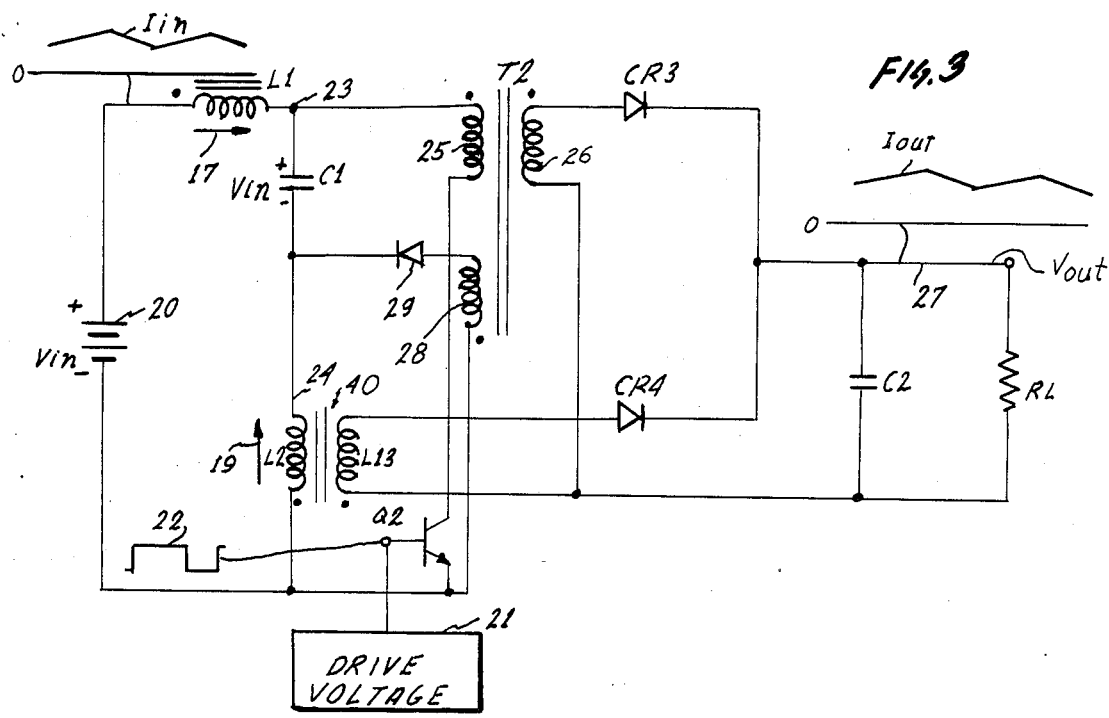
FIG. 3 is a circuit diagram of a transformer-coupled two-inductor forward buck converter in accordance with the present invention.

Reference will next be made to FIG. 3 which is a transformer-coupled version of a two-inductor forward buck invention. As noted, this buck converter comprises a series input circuit including an input inductor L1, a capacitor C1 and a grounded inductor L2. Since either polarity of voltage can be achieved across the ends of an inductor depending on the direction in which its coils are wound, the outer end of each of the input inductor L1 and the grounded inductor L2 is provided with a dot indicating the same polarity end. Thus, the capacitor C1 connects the inner or non-dot ends of the inductors L1 and L2 and the d.c. input voltage source 20 connects across the outer or dot ends of the inductors L1 and L2. A transformer T2 has the dot end of its primary winding 25 connected to the junction 23 between the input inductor L1 and the capacitor C1 and the non-dot end thereof connected to the collector of an npn transistor Q2 whose emitter is connected to the reflected output ground return for the input circuit. The secondary winding 26 of transformer T2 has its non-dot end connected to the ground return for the output circuit and its dot end connected to the anode of a rectifying diode CR3 which has its cathode connected to the output line 27.

A reset voltage winding 28 is coupled to the transformer T2. The reset voltage winding 28 has its dot end connected to the reflected output ground return for the input circuit and its non-dot end connected to the anode of a diode 29 whose cathode is connected to a junction 24 between the capacitor C1 and the grounded inductor L2. The purpose of the reset voltage winding 28 is to enable the transformer T2 to reset, i.e., to return the magnetizing current when the transistor Q2 is turned off.

In addition, the circuit shown in FIG. 3 has an output winding L13 tightly coupled to the grounded inductor L2 to form a magnetic component 40. The inductor L2 and the output winding L13 are coupled such that their dot ends are adjacent to each other. The output winding L13 has its dot end connected to the ground return for the output circuit and its non-dot end connected to the anode of a rectifying diode CR4 which has its cathode connected to the output line 27. As will be explained hereinafter, the function of the output winding L13 is to provide a proper voltage on the non-dot end of the grounded inductor L2 when the switching transistor Q2 is turned off, i.e., during the Toff time of a switching period Tsw, and also to provide a path through diode CR4 by which the stored current energy in inductors L1 and L2 can be supplied to the output line 27 during Toff. There must be a path for the stored current energy in inductors L1 and L2 to flow into during Toff otherwise the circuit would blow up.

In the circuit of FIG. 3, the ratio of the turns of the primary winding 25 to the turns of the secondary winding 26 in transformer T2 must be equal to the ratio of the turns of the grounded inductor L2 to the turns of the output winding L13 in the magnetic component 40. As will be described hereinafter this is necessary to ensure that there will be no steps in the output current Iout.

It should now be clearly understood that the buck converter circuit in FIG. 3 includes three windings, the input inductor L1 connected in series with the d.c. input voltage source 20, the inductor L2 which is connected to the reflected output ground return of the input circuit, and the output winding L13 which is coupled to the grounded inductor L2, to form the magnetic component 40, and which has one end connected in series with the output line 27 through diode CR4.

In order to understand the operation of the circuit in FIG. 3, the first thing to note is that when the d.c. input voltage source 20 is applied across the series circuit including input inductor L1, capacitor C1 and grounded inductor L2, the capacitor C1 immediately charges up to +Vin. This is because inductors L1 and L2 are d.c. shorts. It should be understood that capacitor C1 remains charged up in this manner at all times, whether the switching transistor Q2 is turned on or off. It should be further noted that although the charge on capacitor C1 may vary slightly during the operation, the size of capacitor C1 is large enough so that the voltage thereacross remains fairly constant, having at the most a slight ripple present thereon.

Figure 4:
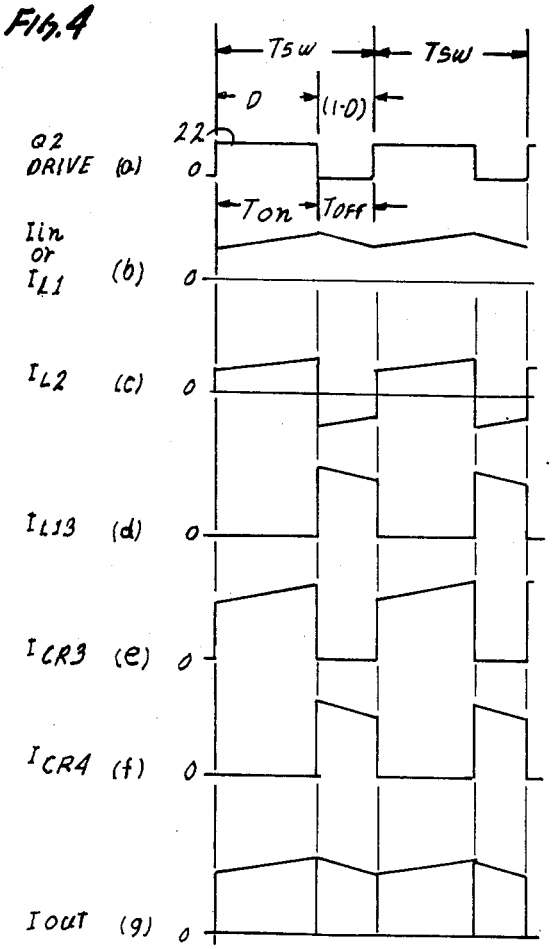
FIG. 4 shows waveforms for explaining the operation of the transformer-coupled two-inductor forward buck converter in FIG. 3.

Next to be noted is that the drive voltage source 21 is set to provide a square wave drive voltage 22 of a predetermined duration, as shown in FIG. 4a, to the base of transistor Q2 to operate the circuit, i.e., to periodically turn the switching transistor Q2 on and off to define the fixed Ton and Toff times during each successive Tsw switching period. Accordingly, the operation of the circuit in FIG. 3 can best be described by referring to the Ton time and the Toff time of the Tsw switching period.

During Ton, i.e., when transistor Q2 turns on, the junction 23 goes to +Vout reflected (assuming ideal components) because the dot end of secondary winding 26 is +Vout and, therefore, the dot end of primary winding 25 is +Vout (the voltage across the load). As a result of transistor Q2 being turned on, a ramping up current $I_{L1}$ flows through inductor L1, in the direction indicated by arrow 17, while storing energy in inductor L1. Now with +Vout at junction 23, the junction 24 is (−Vin +Vout) and since Vin is always greater in magnitude than Vout, the junction 24 is driven negative with respect to ground (FIG. 5c), and therefore, causes a ramping up current $I_{L2}$ to conduct out of inductor L2, in the direction indicated by arrow 19, while storing energy in inductor L2. This current $I_{L2}$ flows up through capacitor C1 and joins with the current $I_{L1}$ at junction 23 to flow through the primary winding 25 of transformer T2 and set up a positive current $(I_{L1}+I_{L2})$ in the secondary winding 26 which passes through rectifying diode CR3 as current $I_{CR3}$ (FIG. 4e) to the output line 27.

It should be noted that during Ton time the current $I_{L13}$ in output winding L13 is zero because the non-dot end of inductor L2 is negative in polarity and therefore the non-dot end of output winding L13 is negative in polarity resulting in diode CR4 being reverse biased.

During Toff time, with the transistor Q2 turned off, the stored current $I_{L1}$ in inductor L1, needing a path to flow in, immediately starts to conduct through capacitor C1 into inductor L2. Since the voltage across inductor L2 is +Vout reflected (FIG. 5c) on the non-dot end thereof and is −Vout across the inductor L2 with respect to the polarity mark, the current $I_{L2}$ ramps down through inductor L2 (FIG. 4c) during Toff time. By having current $I_{L1}$ flow through inductor L2 in a direction from the non-dot end to the dot end thereof, a field is set up by transformer action in magnetic component 40 which reverses the polarity in output winding L13 causing diode CR4 to become forward biased, and effectively clamps the non-dot end of the output winding L13 at +Vout and, therefore, the non-dot end of inductor L2 at +Vout.

Simultaneously, during Toff time, the current $I_{L2}$ stored in inductor L2, since it can no longer flow through transistor Q2, and having to go somewhere, abruptly stops and then, takes the only path available, and, without reversing polarity, joins with the current $I_{L1}$ in forming a current $(I_{L1}+I_{L2})$ which commutates to the output winding L13 as current $I_{L13}$ (FIG. 4d) and conducts through rectifying diode CR4 to provide a ramping down current $I_{CR4}$ (FIG. 4f) on the output line 27. It should now be clear that diode CR4 operates as a complementary switch to the switching on and off of the transistor Q2.

The ramping up current $I_{CR3}$ (FIG. 4e) supplied on output line 27 during the Ton time and the ramping down current $I_{CR4}$ (FIG. 4f) supplied on output line 27 during the Toff time combine to form the continuous current Iout (FIG. 4g) ramping up and down on the output line 27. Since, as previously discussed, the ratio of the turns of the primary and secondary windings in transformer T2 and the ratio of the turns of the coupled inductor L2 and the output winding L13 in magnetic component 40 are the same, there are no steps present on the current Iout.

It should now be clearly understood that the current Iout is either being delivered through transformer T2 to the output line 27 when switching transistor Q2 is turned on or being delivered through the magnetic component 40 and through the complementary switching diode CR4 to the output line 27 when the switching transistor Q2 is turned off. The current never stops flowing, it just commutates through different paths to the output line 27.

So, during Ton time both the current $I_{L1}$ and the current $I_{L2}$ are summed upon conducting through the switching transistor Q2 and are being transferred by the transformer T2 to the output line 27, and during Toff time both the current $I_{L1}$ and the current $I_{L2}$ are summed upon being transferred by the magnetic component 40 and are conducting through complementary switching rectifying diode CR4 to the output line 27. In both cases, the current $I_{L1}$ and the current $I_{L2}$ sum together by the same turns ratio, thus assuring that there are no steps in the output current Iout which would make the output current Iout discontinuous. It should be noted that because the non-dot ends of the inductor L1 and the inductor L2 are connected by an a.c. short, namely, capacitor C1, the capacitor C1 is just a point where the current comes and goes and in the long term the energy balance is no d.c. current in the capacitor C1.

It should be especially noted that as a result of the current $I_{L2}$ (FIG. 4c) flowing in inductor L2 as a positive current during Ton time and as a negative current during Toff time, the buck converter in FIG. 3 has an a.c. current buried in its topology, and yet both the input current Iin and the output current Iout are continuous d.c. currents.

Next to be demonstrated is that the circuit in FIG. 3 clearly operates as a buck converter by showing that its voltage and current transfer functions are the same as those found in the conventional buck converter previously described in connection with FIG. 1.

The relationship of the output voltage Vout to the input voltage Vin for the buck converter shown in FIG. 3 can be obtained by first determining the voltage across the inductor L1 and the voltage across the inductor L2 during the Ton time and the Toff time of a switching period Tsw. Such voltage determinations are of value because it is known that the d.c. voltage across the inductor L1 and the d.c. voltage across the inductor L2, on the average, i.e., during each switching period Tsw, must be zero. Hence by determining the voltage across each of the inductors L1 and L2 during the respective Ton and Toff times of a switching period Tsw, and defining the Ton time and the Toff time in terms of the duty cycle D and the switching period Tsw, equations can be obtained which can be used to derive the voltage transfer function for the buck converter circuit in FIG. 3.

Figure 5:
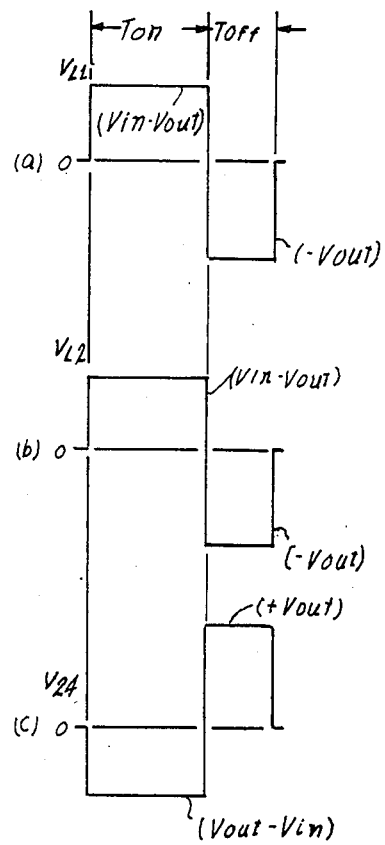
FIG. 5 shows waveforms of voltages in the transformer coupled two-inductor forward buck converter in FIG. 3.

Now during the Ton time of a switching period Tsw, assuming that the components are ideal, the voltage at the non-dot end of the inductor L1, i.e., at the junction 23 of the circuit in FIG. 3, is the output voltage +Vout. This is because the output voltage +Vout on the t line 27 clamps the diode CR3 on the dot end of the secondary winding 26 of transformer T2 and, therefore also provides +Vout on the dot end of the primary winding of transformer T2. It is further noted that the voltage on the dot end of the inductor L1 is always Vin. Accordingly, the voltage $V_{L1}$ across inductor L1 during the Ton time is (Vin−Vout), as illustrated in FIG. 5a.

Now, if during Ton time, the output voltage at junction 23 of the circuit in FIG. 3 is +Vout, the voltage $V_{24}$ (FIG. 5c) at junction 24, which is the non-dot end of inductor L2, is (Vout−Vin), since the voltage at the non-dot end of inductor L2 is −Vin. But since Vin is always greater in magnitude than Vout, then the junction 24 is negative with respect to ground. This voltage (Vout−Vin) is the absolute voltage across inductor L2. However, the dot end of inductor L2 is positive and so when the polarity is reversed, the polarity across inductor L2 with respect to the dot is obtained. Thus, the voltage VL2 across inductor L2 during the Ton time is equal to (Vin−Vout), as illustrated in FIG. 5b.

Thus, it has been shown that the voltages across inductors L1 and L2 are the same during Ton, namely, (Vin−Vout).

Now during Toff time of a switching period Tsw, the first thing to note is that the switching transistor Q2 has been turned off, thus disconnecting the d.c. input voltage source 20. The other thing to note is that the stored current energy in each of the inductors L1 and L2 has got to go somewhere.

Thus, during Toff, the junction 23 is (Vout+Vin) because the voltage on the dot end of inductor L1 is Vin and the voltage on the junction 24 is +Vout because diode CR4 is forward biased and that provides (Vout+Vin) at junction 23. Now, since the dot end of inductor L1 is +Vin all the time, the junction 23 has a voltage which with respect to the polarity dot on inductor L1 is negative or −Vout. Thus the voltage $V_{L1}$ across the inductor L1 during Toff is −Vout, as illustrated in FIG. 5a.

Now, inasmuch as junction 24, which is the non-dot end of inductor L2, as previously described, is +Vout (FIG. 5c), during Toff, and the dot end of inductor L2 is positive, then the junction 24 has a voltage with respect to the polarity dot on inductor L2 which is negative or −Vout. Thus, the voltage $V_{L2}$ across the inductor L2 during Toff is −Vout, as illustrated in FIG. 5b.

So from the above, it has been now demonstrated that, for the buck converter in FIG. 3, the voltage $V_{L1}$ across the inductor L1 and the voltage $V_{L2}$ across the inductor L2 are the same during Ton and Toff of a switching period Tsw, as illustrated in FIGS. 5a and 5b.

Thus, during Ton:
$V_{L1}$ = (Vin − Vout), and
$V_{L2}$ = (Vin − Vout)
and during Toff:
$V_{L1}$ = − Vout and
$V_{L2}$ = − Vout Having determined the voltages across the inductors L1 and L2 during Ton and Toff time of a switching period Tsw, it is now possible to solve for the relationship between duty cycle D, Vin and Vout.

Now it is known that duty cycle D = Ton/Tsw
Thus:
Ton = DTsw, and
Toff = (1 − D)Tsw As previously noted, the d.c. voltage across an inductor has to be zero on the average. So, during a switching period Tsw, the integral of Vdt for the Ton time plus the integral of Vdt for the Toff time has to be equal to zero.

Now the integral of Vdt for a square wave type waveform is just the product of the voltage multiplied by the time, and since the voltage is a square wave during each of the Ton and Toff times this can be easily shown as:

(Vin − Vout)DTsw + (−Vout)(1 − D)Tsw = 0

Solving this equation shows that

Vout = DVin     (1)

The above equation (1) is the fundamental relationship for Vin and Vout for a given duty cycle D in the converter of FIG. 3 which states that the output voltage is some fraction of the input voltage Vin which is exactly equal to the duty cycle, i.e., the ratio of Ton/Toff. So by varying the duty cycle D for a given d.c. input voltage Vin for the buck converter in FIG. 3, it is possible to control the level of its d.c. output voltage Vout.

It should now be noted that the above equation (1) is the same d.c. transfer function indicated for Vin and Vout in the conventional buck converter circuit in FIG. 1.

Next to be demonstrated is the relationship of the output current Iout to the input current Iin for a given duty cycle D in the buck converter of FIG. 3.

Now it is well known that the a.c. current (the change in current) in the capacitor C1, which is the integral of Idt over the period of 0 to Tsw, has to equal zero. If this were not true the d.c. voltage would build up indefinitely in capacitor C1.

So, once again, considering the currents $I_{L1}$ and $I_{L2}$ to be squarewave type currents, which is a valid assumption, what can be provided is an equation which states that the current $I_{L1}$ which is flowing down through capacitor C1 during Toff time plus the current $I_{L2}$ which is flowing up through capacitor C1 during Ton time is equal to zero. This equation is as follows:

$$I_{L1}(1-D)Tsw + (-I_{L2})DTsw = 0 \quad (2)$$

Simplifying this equation provides:

$$I_{L1}(1-D) = I_{L2}D \text{ or}$$

$$I_{L2} = I_{L1}(1-D)/D \quad (3)$$

But what is desired is the relationship between Iin and Iout and it is known that $$I_{L1} = Iin \text{ and} \quad (4)$$

$$I_{L1} + I_{L2} = Iout \quad (5)$$

So by substituting for $I_{L1}$ and $I_{L2}$ in equation (5) their equivalents in equations (4) and (3), respectively, provides:

$$Iin + Iin(1-D)/D = Iout$$

Solving the above equation provides:

$$Iin = DIout \quad (6)$$

The above equation (6) is the same d.c. transfer function indicated for Iin and Iout in the conventional buck converter circuit in FIG. 1.

Clearly this is the correct relationship of Iin, Iout and D for a buck converter inasmuch as if the output voltage is Vout=DVin and the input current is Iin=DIout, then the equating of input power to output power is represented by:

$$VinIin = VoutIout \quad (7)$$

But, as shown by equation (1), Vout=DVin and as shown by equation (6), Iin=DIout.

Substituting for Vout and Iin in equation (7) provides:

$$VinDIout = DVinIout \text{ or}$$

$$VinIout = VinIout$$

So what has been demonstrated above is that the transformer-coupled two-inductor forward buck converter in FIG. 3 is indeed a buck converter. Compared to the conventional transformer-coupled forward buck converter shown in FIG. 1, the buck converter in FIG. 3 has different properties on an a.c. basis, some unique advantageous features not found in the conventional buck converter, and its operation is different, but it is a buck converter.

The important difference between the conventional buck converter in FIG. 1 and the two-inductor buck converter in FIG. 3 is that, in the latter, both the input current Iin and the output current Iout ramp up and down, but they never go to zero, they are both continuous, whereas in the conventional buck converter in FIG. 1, although the output current Iout is continuous, the input current Iin is pulsating and contains a lot of EMI which is undesirable.

It should be further noted that switching transistor Q2 and complementary switching diode CR4 in the two-inductor buck converter in FIG. 3 never have to handle more current than the output current Iout. Moreover, complementary switching diode CR4 never has a voltage on it greater than the input voltage Vin and switching transistor Q2 never has a voltage on it greater than Vin plus two times Vout. Accordingly, these switching components have relatively small switching and power ratings, and are, therefore, inexpensive.

Next to be noted is that although the two-inductor buck converter shown in FIG. 3 is an improvement over the conventional buck converter in FIG. 1, in that the input current Iin is continuous, this input current Iin does have a ripple thereon. This ripple may be undesirable in certain applications of the buck converter which cannot tolerate the EMI problems that are injected thereby back into the supply line from the d.c. input voltage source since such EMI could upset other equipment tied into the same supply line.

Figure 6:
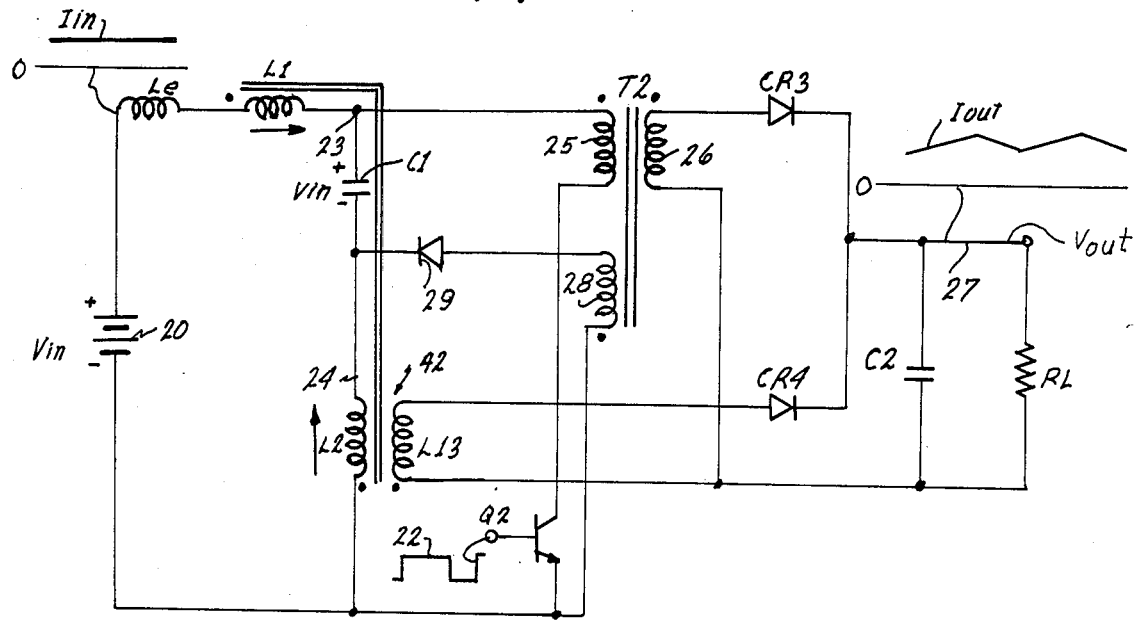
FIG. 6 is a modification of the transformer-coupled two-inductor forward buck converter in FIG. 3 with the input and grounded inductors coupled to provide zero ripple on the input current.

Reference will next be made to FIG. 6 which shows the circuit of FIG. 3 with the inductors L1 and L2 tightly coupled together on a common core along with the output winding L13 to form a single magnetic component 42, thereby enabling the obtaining of zero ripple on the input current Iin. This is possible, since each of the inductors L1 and L2 have the same polarity ends, i.e., the dot ends thereof, connected to a.c. ground and have the opposite ends thereof connected by the capacitor C1 which is an a.c. short. Consequently, the two inductors L1 and L2 have exactly the same a.c. voltage component (ripple) across them, and it is assumed that the voltage across capacitor C1 is not changing because it is a large capacitor. It should be further noted that a small leakage inductance Le is assumed to be in series with the d.c. input voltage source 20. This small leakage inductance Le can be implemented in the circuit by use of a separate component, as a leakage inductance of the L1 inductor, as a wire leakage inductance, or as a leakage inductance that is integrated as a part of the same magnetic component 42 provided for coupling inductors L1, L2 and the output winding L13. The manner of obtaining the leakage inductance Le generally depends on the application of the buck converter.

It should now be clear that the coupling of the inductors L1 and L2 in the topology of the buck converter of FIG. 3 on a single magnetic component 42, along with the output winding L13, as shown in FIG. 6, inherently provides a built-in stage of ripple filtering for the input current Iin. Thus, whereas the conventional buck converter shown in FIG. 1 normally requires at least two stages of input filtering to provide a steady d.c. input current, only one stage of input filtering, if any, is required in the buck converter shown in FIG. 6 to obtain zero ripple on the input current Iin. It should be especially noted that this inherent stage of input current ripple filtering is obtained without the adding of any components or weight to the buck converter in FIG. 3.

It should now be clearly understood that although the buck converter shown in FIG. 3 has a transformer T2 in the middle of it which is turning on and off, the input current Iin and the output current Iout of the converter are both continuous with a small ripple, and if the input inductor L1 and grounded inductor L2 are coupled on a common core, as shown in FIG. 6, it is possible to get rid of even the ripple on the input current Iin.

Figure 7:
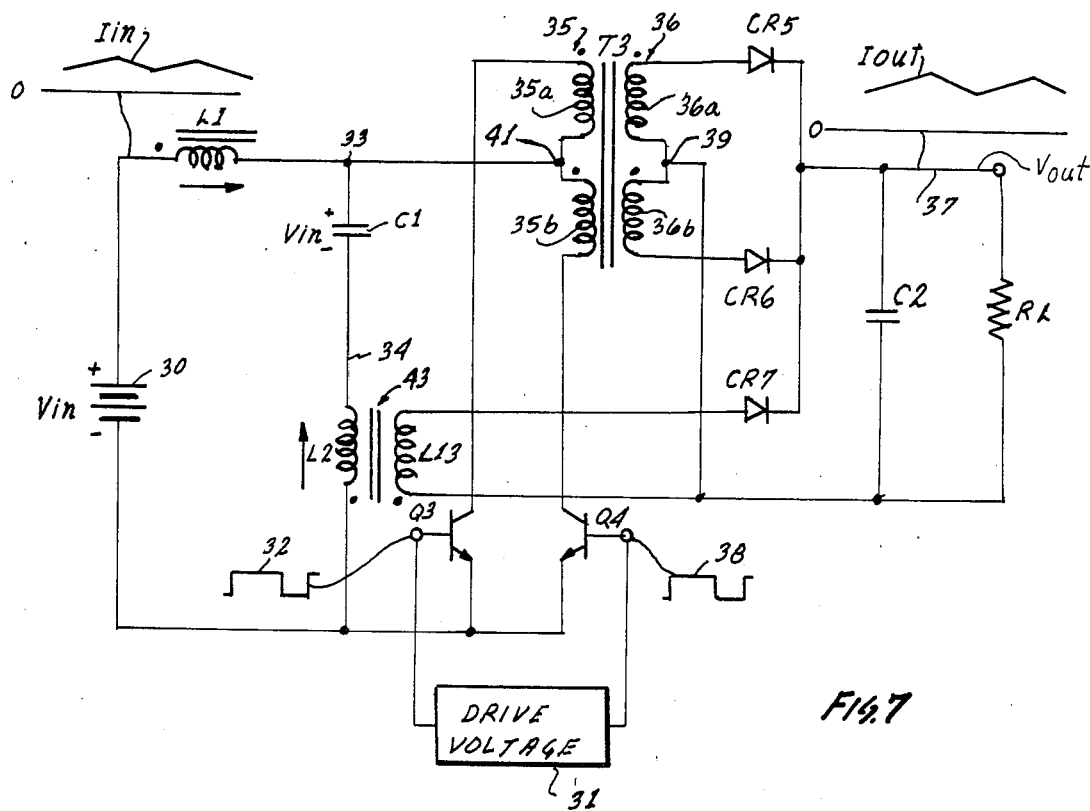
FIG. 7 is a circuit diagram of a transformer-coupled two-inductor push-pull buck converter in accordance with the present invention.

Reference will next be made to FIG. 7 which is a transformer-coupled version of a two-inductor push-pull buck converter circuit. This circuit, similarly to FIG. 3, includes a series circuit comprising an inductor L1, a capacitor C1 and a grounded inductor L2 with the inductors wound in such a manner that the d.c. input voltage source 30 can be connected across the outer dot ends thereof. However, this circuit in FIG. 7 differs from the circuit in FIG. 3 in that the junction 33 of the inductor L1 and capacitor C1 is connected to the midpoint 41 of a primary winding 35 of a transformer T3 having one end connected through a switching transistor Q3 to the reflected output ground return for the input circuit and having the opposite end connected through a switching transistor Q4 to the reflected output ground return for the input circuit. The secondary winding 36 of the transformer T2 has its midpoint 39 connected to the ground return for the output circuit and has one end connected to the anode of a rectifying diode CR5 having its cathode connected to the output line 37 and the opposite end connected to the anode of a rectifying diode CR6 having its cathode connected to the output line 37. The grounded inductance L2 has an output winding L13 coupled thereto to form magnetic component 43. One end of output winding L13 is connected to the ground return for the output circuit and the other end connected to the anode of a rectifying diode CR7 having its cathode connected to output line 37.

As illustrated by the waveforms in FIG. 8, the transformer-coupled two-inductor push-pull converter circuit of FIG. 7 operates by alternately driving the base of switching transistor Q3 by a square wave drive voltage 32 (FIG. 8a) during a given Tsw switching period and then the base of switching transistor Q4 by a square wave voltage 38 (FIG. 8b) during the following Tsw switching period.

Thus, as indicated by the square wave drive voltages 32 and 38 in FIGS. 8a and 8b, each side of the transformer T3 (FIG. 7) is alternately driven that at 100% duty cycle, for example, the transformer T3 is driven 50% of the time on each half, i.e., transistor Q3 is on for one full Tsw switching period and then transistor Q4 is on for the following full Tsw switching period.

During the Ton time of a Tsw switching period that the switching transistor Q3 is turned on, the current $I_{L1}$ in input inductor L1 and the current $I_{L2}$ in grounded inductor L2 are summed to flow through the upper half 35a of a primary winding 35 and through switching transistor Q3 to the reflected output ground return for the input circuit. The $I_{L1}$ component of this return current, namely, DIout, thus flows into the reflected output ground return of the input circuit and the $I_{L2}$ component of the return current, namely, (I-D)Iout, flows into the dot end of ground inductor L2. In this case, a positive current is set up on the upper half 36a of the secondary winding 36 which conducts through the rectifying diode CR5 as current $I_{CR5}$ (FIG. 8f) to the output line 37.

Likewise, during Ton time of each Tsw switching period that the switching transistor Q4 is turned on, the current $I_{L1}$ in input inductor L1 and the current $I_{L2}$ in grounded inductor L2 are summed to flow through the lower half 35b of the primary winding 35 and through switching transistor Q4 to the reflected output ground return for the input curcuit. Thus, the $I_{L1}$ component of the return current, namely, DIout, flows into the reflected output ground return of the input circuit and the $I_{L2}$ component of the return current, namely, (1-D)Iout, flows into the dot end of the grounded inductor L2. In this case a positive current is set up on the lower half 36b of the secondary winding 36 which conducts through rectifying diode CR6 as current $I_{CR6}$ (FIG. 8g) to the output line 37.

During the Toff time of each of the Tsw switching periods that switching transistor Q3 or Q4 is turned on, the stored current in the inductor L1 and the stored current in the inductor L2 flow, similarly to the stored currents in the circuit of FIG. 3 during Toff time, to provide a positive current pulse $I_{L13}$ (FIG. 8e) equal to the sum thereon on the output winding L13. Thus, during Toff time the $I_{L1}$ stored current component of output current Iout, namely, DIout, flows down through capacitor C1 and inductor L2 and into the reflected output ground return of the input circuit. The $I_{L2}$ stored component of the output current Iout, namely, (1-D)Iout, commutates to the output winding L13, along with the $I_{L1}$ current in inductor L2 that transfers by transformer action to output winding L13, and these two currents set up a positive current on the output winding L13 which conducts through rectifying diode CR7 as current $I_{CR7}$ (FIG. 8h) to the output line 37.

It should now be clear that current alternately flows through the switching transistors Q3 and Q4 during the Ton times of successive Tsw switching periods through diodes CR5 and CR6, respectively, to the output line 37, and during the Toff time of each of these Tsw switching periods the current flows through the same diode CR7 to the output line 37.

Thus, as illustrated in FIG. 8, during a Tsw switching period that switching transistor Q3 is turned on the current $I_{CR5}$ (FIG. 8f) flowing during the Ton time is immediately followed by the current $I_{CR7}$ (FIG. 8h) flowing during the Toff time to provide the continuous current Iout (FIG. 8i) on output line 37 during this Tsw switching period. Likewise, during the following Tsw switching period that switching transistor Q4 is turned on the current $I_{CR6}$ (FIG. 8g) flowing during the Ton time is immediately followed by the current ICR7 (FIG. 8h) flowing during the Toff time to provide the continuous current Iout (FIG. 8i) on output line 37 during this Tsw switching period. Accordingly, the output current $I_{out}$ is a continuous current with a ripple as illustrated in FIG. 8i.

Figure 9:
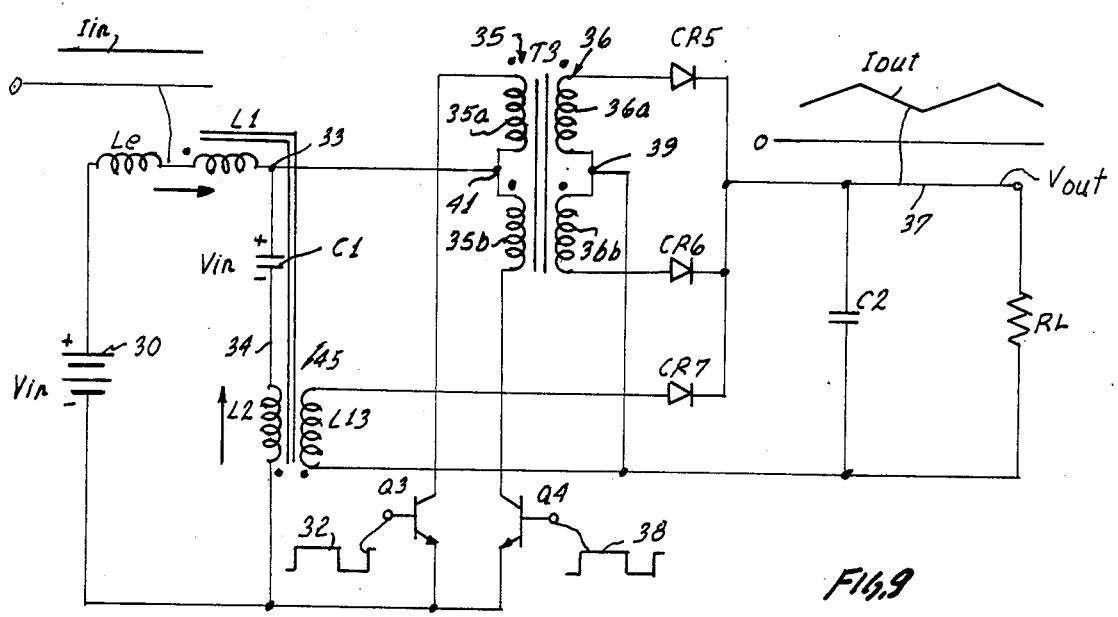
FIG. 9 is a modification of the transformer-coupled two-inductor push-pull buck converter in FIG. 7 with the input and grounded inductors coupled to provide zero ripple on the input current.

As shown in FIG. 9, the ripple on the input current Iin of the circuit in FIG. 7 can be eliminated, in a manner similar to that described in connection with FIG. 6, by tightly coupling the input inductor L1 and the grounded inductor L2 on a common core along with the output winding L13 and providing a small leakage inductor Le in series with the input current from source 20.

While the invention has been illustrated and described in detail in the drawings and foregoing description, the same is to be considered as illustrative and not restrictive in character, it being understood that only the preferred embodiments have been shown and described and all changes and modifications that come within the spirit and scope of the invention are also desired to be protected.

Having described the invention what is claimed as new in support of Letters Patent is:

1. A buck converter for applying a d.c. voltage source to a load comprising:
   an input inductor;
   a capacitor;
   a grounded inductor;
   said input inductor, capacitor and grounded inductor forming a series circuit with said d.c. voltage source applied across said series circuit said series circuit having a junction between said input inductor and said capacitor, and a junction between said grounded inductor and said capacitor;
   a switching transistor;
   a transformer having a primary winding and a secondary winding, said primary winding connecting the junction between said input inductor and said capacitor via said switching transistor to a ground return for the source, and said secondary winding having one end connected to the load and the other end connected to the ground return for the load;
   a reset winding coupled to said transformer and having one end connected to the junction between said grounded inductor and said capacitor and its other end connected to the ground return for the source;
   diode;
   an output winding inductively coupled to said grounded inductor and having one end connected via the diode to the load and its other end connected to the ground return for the load; and
   driving means for periodically turning on and off said switching transistor;
   whereby when said switching transistor is turned on current in said grounded inductor conducts through said capacitor and joins with input current in said input inductor to conduct through said primary winding to induce a voltage across said secondary winding to provide output current to the load; and
   whereby when said switching transistor is turned off stored current in said input inductor conducts through said capacitor into said grounded inductor and joins with stored current in said grounded inductor to induce a voltage across said output winding to provide output current which conducts through the diode to the load.

2. A buck converter as defined in claim 1 wherein when the d.c. voltage source is applied across said series circuit, said capacitor is charged to the d.c. voltage of said source and remains charged during the time the switching transistor is turned on and off.

3. A buck converter as defined in claim 1 wherein the primary winding and the secondary winding of said transformer have a given turns ratio and wherein the grounded inductor and the inductively coupled output winding have the same turns ratio.

4. A buck converter as defined in claim 1 wherein said input current and output current are continuous with a ripple.

5. A buck converter as defined in claim 1 wherein said input and grounded inductors are inductively coupled and a leakage inductance is connected in series with the input inductor, whereby ripple is reduced on the current in said input inductor.

6. A transformer-coupled two-inductor buck converter for providing a d.c. voltage level conversion of a d.c. voltage source as needed for a load, said buck converter comprising:
   an input inductor;
   a capacitor;
   a grounded inductor;
   said input inductor, said capacitor and said grounded inductor forming a series circuit with said d.c. voltage source applied across said series circuit, said series circuit having a junction between said input inductor and said capacitor;
   a first and second switching transistor;
   a transformer having a primary and secondary winding;
   the junction between said input inductor and said capacitor connected to a midpoint of said primary winding having its ends respectively connected by said first and second switching transistors to a ground return for said source;
   a diode;
   an output winding inductively coupled to said grounded inductor, said output winding having one end connected by said diode to the load and the other end connected to a ground return for the load; and
   driving means for alternately turning on said first and second switching transistor during respective first portions of successive switching periods.
   whereby when either of said switching transistor is turned on during a first portion of a switching period, current in said grounded inductor conducts through said capacitor and joins with input current in said input inductor to conduct through a half of the primary winding connected to said switching transistor that is turned on to induce a voltage across said secondary winding to provide output current to the load; and
   whereby when said switching transistor that is turned on during a first portion of a switching period is turned off during the remaining portion of the switching period, stored current in said input inductor conducts through the capacitor into said grounded inductor and joins with stored current in said grounded inductor to induce a voltage across the output winding to turn on the diode and provide output current to said load.

7. A buck converter as defined in claim 6 wherein said capacitor is charged to the d.c. voltage of said source and remains charged during the time the switching transistor is turned on and off.

8. A buck converter as defined in claim 6 wherein the primary winding and secondary winding of the transformer have a given turns ratio and the inductively coupled grounded inductor and output winding have the same turns ratio.

9. A buck converter as defined in claim 6 wherein said input current and output current are continuous with a ripple.

10. A buck converter as defined in claim 6 wherein said input and grounded inductors are inductively coupled and a leakage inductance is connected in series with the input inductor, whereby ripple is reduced on the input current in said input inductor.

11. A buck converter for supplying a d.c. input voltage from a d.c. voltage source to a load, said buck converter comprising:
    an input inductor having a positive polarity end;

a capacitor;

a grounded inductor having a positive polarity end;

said input inductor, said capacitor and said grounded inductor connected to form a series circuit with said d.c input voltage source connected across said series circuit, a transformer having primary and secondary windings;

an output winding inductively coupled to said grounded inductor to form a magnetic component; and switching means for alternately enabling input current conducting through the input inductor and current conducting through said grounded inductor to be transferred by the transformer to provide output current to the load, and enabling stored current in said grounded inductor and stored current in the input inductor to be transferred by the magnetic component to provide output current to the load.

12. A buck converter as defined in claim 11 wherein the input and output currents are continuous with a ripple.

13. A buck converter as defined in claim 11 wherein said switching means comprises:

a switching transistor which when turned on provides for the input current conducting through said input inductor and the current conducting through said grounded inductor to transfer through said transformer to deliver output current to the load; and a diode connecting the output winding to the load which is turned on when the switching transistor is turned off and provides for stored current in said input inductor and stored current in said grounded inductor to transfer through said magnetic component and conduct through said diode to deliver output current to the load.

14. A buck converter as defined in claim 11 wherein the primary and secondary windings of said transformer have a given turns ratio and wherein the coupled grounded inductor and output winding of said magnetic component have the same turns ratio.

15. A buck converter for supplying from a d.c voltage source a reduced level d.c. voltage for a load, said converter comprising:

an input inductor wound to have a positive polarity end;

a capacitor;

a grounded inductor wound to have a positive polarity end;

means for connecting said input inductor, said capacitor and said grounded inductor to form a series circuit with said d.c. voltage source applied across said series circuit, means including a switching transistor responsive to input current in the input inductor and current conducted through said grounded inductor to provide output current to the load when the switching transistor is turned on; and means including a normally turned off diode responsive to stored current energy in the input inductor and stored current energy in the grounded inductor to turn on the diode and provide output current to the load when the switching transistor is turned off.

16. A buck converter as defined in claim 15 wherein said input current and said output current are continuous with a ripple.

* * * * *